(12) United States Patent
Huynh et al.

(10) Patent No.: US 8,125,798 B2
(45) Date of Patent: *Feb. 28, 2012

(54) CONSTANT CURRENT AND VOLTAGE CONTROLLER IN A THREE-PIN PACKAGE OPERATING IN CRITICAL CONDUCTION MODE

(75) Inventors: Steven Huynh, Sunnyvale, CA (US); Jian Yang, Thousand Oaks, CA (US); Mingliang Chen, Sterrett, AL (US)

(73) Assignee: Active-Semi, Inc. (VG)

( * ) Notice: Subject to any disclaimer, the term of this patent is extended or adjusted under 35 U.S.C. 154(b) by 850 days.

This patent is subject to a terminal disclaimer.

(21) Appl. No.: 12/217,052

(22) Filed: Jul. 1, 2008

(65) Prior Publication Data

US 2010/0002480 A1    Jan. 7, 2010

(51) Int. Cl.
*H02M 3/335* (2006.01)
(52) U.S. Cl. .................. 363/21.12; 363/21.18; 363/97; 363/147
(58) Field of Classification Search ............. 363/18, 363/19, 21.12–21.16, 97
See application file for complete search history.

(56) References Cited

U.S. PATENT DOCUMENTS

| | | | | |
|---|---|---|---|---|
| 6,044,002 | A * | 3/2000 | Van Der Wal et al. | 363/97 |
| 7,209,372 | B2 * | 4/2007 | Jang et al. | 363/21.14 |
| 7,505,287 | B1 * | 3/2009 | Kesterson | 363/21.01 |
| 7,911,814 | B2 * | 3/2011 | Tao et al. | 363/21.12 |

OTHER PUBLICATIONS

Peak Electronics, Newletter, Jan. 2008, PEAK electronics GmbH, PECO-Line 1.5-6 Watt Low cost DC/DC-Converters, downloaded from Internet www.peak-electronics.de (2 pages).
Y.B. Park and H.S. Choi, article entitled "Improving efficiency in active mode," in Connecting Industry, May 20, 2008, downloaded from Internet www.connectingindustry.com/story.asp?storycode=185281 (6 pages).
Elmos Product Catalog 2007/2008, "Wide range flyback SMPS with watchdog," pp. 28-29, ELMOS Semiconductor AG (2 pages).

* cited by examiner

*Primary Examiner* — Jeffrey Sterrett
*Assistant Examiner* — Lakaisha Jackson
(74) *Attorney, Agent, or Firm* — Imperium Patent Works; Darien K. Wallace

(57) ABSTRACT

A self-oscillating flyback converter includes a controller integrated circuit housed in a 3-pin package. A switch control terminal is coupled to the base of an inductor switch that controls the current through a primary inductor of the converter. The controller IC adjusts the on time of the switch such that output current remains constant in constant current mode and output voltage remains constant in constant voltage mode. A signal received on a switch control terminal turns the switch off and provides an indication of the output current when the switch is on. A signal received on a feedback terminal powers the controller IC and provides an indication of the output voltage when the switch is off. The controller IC is grounded through a ground terminal. The flyback converter transitions from critical conduction mode to discontinuous conduction mode at light loads to prevent its efficiency from deteriorating at high switching frequencies.

31 Claims, 9 Drawing Sheets

| OUTPUT LOAD CURRENT | TYPICAL FREQUENCY AND MODE AT 110V AC | TYPICAL PEAK CURRENT AT 110V AC | TYPICAL FREQUENCY AND MODE AT 220V AC | TYPICAL PEAK CURRENT AT 220V AC |
|---|---|---|---|---|
| 0 | 1.5 kHz (DCM) | 50 mA | 1.5 kHz (DCM) | 50 mA |
| 25% | 195 kHz (CRM) | 37 mA | 33 kHz (DCM) | 86 mA |
| 50% | 94 kHz (CRM) | 67 mA | 141 kHz (CRM) | 61 mA |
| 75% | 60 kHz (CRM) | 100 mA | 92 kHz (CRM) | 86 mA |
| 100% | 43 kHz (CRM) | 137 mA | 68 kHz (CRM) | 112 mA |

FIG. 8

ADJUSTING ON-TIME TO CONTROL
OUTPUT CURRENT AND VOLTAGE

CONSTANT CURRENT AND VOLTAGE CONTROLLER IN A THREE-PIN PACKAGE OPERATING IN CRITICAL CONDUCTION MODE

TECHNICAL FIELD

The present invention relates generally to the field of power conversion and, more particularly, to a primary-side regulated controller that uses only three pins to generate constant output current and constant output voltage.

BACKGROUND

Flyback converters are used as battery chargers and AC adapters that can supply a constant current to a heavy load and a constant voltage to a light load, for example as a battery becomes fully charged. Flyback converters can operate in discontinuous conduction mode (DCM), critical conduction mode (CRM) or continuous conduction mode (CCM). In discontinuous conduction mode, there is a time gap after all of the energy that was transferred to a secondary inductor has been released and before current again begins to ramp up through a primary inductor. In continuous conduction mode, current begins to ramp up in the primary inductor before current has stopped flowing through the secondary inductor to release the transferred energy. In critical conduction mode, current begins to ramp up in the primary inductor at approximately the same time as current stops flowing through the secondary inductor.

Operating a flyback converter in critical conduction mode has various advantages. For example, switching losses are reduced by the self-oscillating ability of flyback converters that operate in critical conduction mode. In addition, the peak inductor current required to achieve a given charging power is lower in critical conduction mode than in discontinuous conduction mode. Although the average current in both cases is the same, there is no dead time in critical conduction mode. Higher efficiency in energy transfer can be achieved with the lower peak current. In addition, higher efficiency is achieved in critical conduction mode than in continuous conduction mode in which the primary inductor begins charging before all of the energy has been released from the secondary inductor.

There are various existing designs for flyback converters that are self-oscillating and operate in critical conduction mode. FIG. 1 (prior art) illustrates an exemplary prior art self-oscillating flyback converter 10, also called a "ringing choke converter". The self-oscillation is accomplished using two bipolar transistors. A first transistor $Q_1$ 11 acts as a switch to a primary inductor 12. A second transistor $Q_2$ 13 turns off first transistor $Q_1$ 11 at the end of each switching cycle. Converter 10 controls its output current and voltage by receiving feedback from the secondary side of a transformer 14 via an optical coupler 15. Converter 10 also uses a shunt reference $U_1$ 16 on the secondary side. For example, shunt reference $U_1$ 16 is a 3-pin part TL431 that regulates its third terminal to 1.25 volts.

Converter 10 has the disadvantage that it is relatively expensive because it takes many components to implement constant output voltage and constant output current controls. As shown in FIG. 1, shunt reference $U_1$ 16, resistors $R_2$, $R_3$ and $R_6$ and capacitor $C_2$ and are used for constant output voltage control. Transistor $Q_3$ and resistors $R_4$ and $R_5$ are used for constant output current control. Optical coupler 15 is also required to transfer the control signal from the secondary side to the primary side of the flyback converter 10. The two external bipolar transistors 11 and 13 on the primary side, as well as optical coupler 15 and shunt reference 16, all add to the cost of converter 10. In addition, the discrete components of converter 10 are not as reliable over time compared to equivalent components in an integrated circuit.

When converter 10 is first turned on, current flowing through a start resistor $R_{START}$ 17 increases the base voltage $V_B$ of transistor $Q_1$ 11 and turns on transistor $Q_1$ 11. As transistor $Q_1$ 11 turns on, a positive regenerative feedback develops through an auxiliary inductor 18 and is applied through an R/C network 19 to the base of transistor $Q_1$ 11, turning on transistor $Q_1$ 11 rapidly. As the emitter current of transistor $Q_1$ 11 increases, the voltage across an emitter resistor $R_E$ 20 adds to a feedback voltage $V_{FB}$ from optical coupler 15 and increases the base voltage of transistor $Q_2$ 13. When transistor $Q_2$ 13 turns on, current is drained from the base of transistor $Q_1$ 11, and the base voltage $V_B$ decreases. As transistor $Q_1$ 11 begins to turn off, current stops flowing through primary inductor 12 and the voltages across all inductors of transformer 14 reverse in accordance with normal fly-back action. A regenerative turn-off results from current flowing through auxiliary inductor 18 and R/C network 19 to the base of transistor $Q_1$ 11. Transistor $Q_1$ 11 remains off until all of the energy that was stored in transformer 14 is transferred to the secondary side. In a heavy load condition, the next switching cycle to turn on transistor $Q_1$ 11 will be immediately kicked off by resonant current from auxiliary winding controlled by the feedback loop. In a light or no load condition, when current is no longer flowing through any of the inductors, the voltages across the inductors fall to zero. When the voltage across auxiliary inductor 18 is zero and input current through start resistor $R_{START}$ 17 has again accumulated on the base of transistor $Q_1$ 11, transistor $Q_1$ 11 turns on and a new cycle begins.

FIG. 2 (prior art) shows a much simpler implementation of a self-oscillating flyback converter 21. Converter 21 accomplishes self-oscillation using two bipolar transistors. Feedback to regulate output current and voltage is received from a reflected voltage through a transformer 22. Although converter 21 does not employ an optical coupler and a shunt reference, the two bipolar transistors and the many discrete components add to the cost of the convert.

Similar to converter 10, converter 21 also uses regenerative feedback to turn its transistors on and off. When converter 21 is first turned on, current flowing through a start resistor $R_{START}$ 23 increases the base voltage of a transistor $Q_1$ 24, and transistor $Q_1$ 24 begins to turn on. Transistor $Q_1$ 24 then turns on rapidly because, as it turns on, a current begins to flow through an auxiliary inductor 25. A positive regenerative feedback voltage develops across auxiliary inductor 25 and is applied through an R/C network 26 to the base of transistor $Q_1$ 24. As the emitter current of transistor $Q_1$ 24 increases, the voltage across an emitter resistor $R_E$ 27 increases the base voltage of a second transistor $Q_2$ 28. While transistor $Q_1$ 24 was off, the base voltage of second transistor $Q_2$ 28 was set by the feedback voltage across auxiliary inductor 25 as conditioned by a feedback network 29 of diodes $D_1$ and $D_2$, resistors $R_1$ and $R_2$ and capacitor $C_1$. When the voltage across emitter resistor $R_E$ 27 increases past the voltage set by feedback network 29, transistor $Q_1$ 24 begins to turn off. In accordance with normal fly-back action, the voltages across all inductors of transformer 22 reverse when current stops flowing through a primary inductor 30 of transformer 22.

Now regenerative turn-off results from current flowing through auxiliary inductor 25 and R/C network 26 to the base of transistor $Q_1$ 24 and turns off transistor $Q_1$ 24 quickly. Transistor $Q_1$ 24 remains off until all of the energy that was stored in transformer 22 is transferred to the secondary side. In a heavy load condition, the next switching cycle to turn on transistor $Q_1$ 11 will be immediately kicked off by resonant current from auxiliary inductor 25 controlled by the feedback loop. In a light or no load condition, when current is no longer flowing through any of the inductors, the voltages across the inductors falls to zero. When the voltage across auxiliary inductor 25 is zero and input current through start resistor $R_{START}$ 23 has again accumulated on the base of transistor $Q_1$ 24, transistor $Q_1$ 24 begins to turn on and a new cycle begins.

Feedback network 29, which includes diodes $D_1$ and $D_2$, resistor $R_1$ and capacitor $C_1$, is used to control constant output voltage by turning off transistor $Q_1$ 24 SO as to vary its on time. The emitter resistor $R_E$ 27, resistor $R_2$ 31, capacitor $C_2$ 32 and second transistor $Q_2$ 28 are used to control constant output current. The main disadvantage of flyback converter 21 is the poor accuracy of the output voltage and the output current.

A less expensive self-oscillating, primary-side controlled flyback converter is sought that has fewer external components and that can operate in critical conduction mode but yet that accurately controls constant output current and voltage. For example, a self-oscillating, primary-side controlled flyback converter with only one external transistor is sought that is controlled by a controller IC contained in an IC package with few pins.

SUMMARY

A self-oscillating flyback converter includes a controller integrated circuit (IC) housed in an IC package with only three terminals: a ground terminal, a switch control terminal and a feedback terminal. Both the switch control terminal and the feedback terminal are used for dual functions. The controller IC is grounded through the ground terminal. The switch control terminal is coupled to the base of an external inductor switch that controls the current flowing through a primary inductor of the flyback converter. The controller IC adjusts the on time of the inductor switch such that the output current remains constant in a constant current mode and such that the output voltage remains constant in a constant voltage mode. In the constant current mode, the controller IC controls the peak amount of current flowing through the primary inductor such that the output current of the flyback converter does not exceed a predetermined current limit. The on time of the inductor switch corresponds to the on time of an inductor switch control signal that controls an internal main power switch in the controller IC. The drain of the main power switch is coupled via the switch control terminal to the base of the external inductor switch.

A base signal received on the switch control terminal both turns the inductor switch off and provides an indication of the output current when the inductor switch is on. The base signal is indicative of the rate at which current flows through the primary inductor of the flyback converter. The inductor switch is turned on both by the inductor switch control signal turning off the internal main power switch and by the regenerative drive of current flowing through an auxiliary inductor of the flyback converter. A feedback signal received on the feedback terminal both powers the controller IC and provides an indication of the output voltage when the inductor switch is off. The feedback signal is derived from a voltage across the auxiliary inductor of the flyback converter.

Although the flyback converter operates in critical conduction mode during the constant current mode, the controller IC maintains a minimum off time for the inductor switch in order to prevent the efficiency of the flyback converter from deteriorating at light loads. As the load on the flyback converter decreases in critical conduction mode and the switching frequency increases to a threshold corresponding to the minimum off time, the flyback converter transitions from critical conduction mode to discontinuous conduction mode, and the maximum switching frequency is limited.

The controller IC includes an auto-zeroing circuit and a switch capacitor circuit. The auto-zeroing circuit determines the current flowing through the primary inductor by auto-zeroing the voltage of the base signal such that the base-emitter offset voltage of the inductor switch is subtracted out. The switch capacitor circuit supplies the negative voltage of the feedback signal while the inductor switch is off to one plate of a feedback capacitor and supplies a reference voltage of a similar positive magnitude to the other plate of the capacitor.

A method of operating a power converter includes a step of magnetically coupling a secondary inductor and an auxiliary inductor to a primary inductor of the power converter. The power converter has an external inductor switch and a controller IC with an internal main power switch. The drain of the internal main power switch is coupled to the base of the external inductor switch. The internal inductor switch is turned off and on by an inductor switch control signal and regenerative feedback.

In another step, a feedback signal is received onto the feedback bond pad of the controller IC. The feedback signal is derived from a voltage across the auxiliary inductor. In another step, the feedback signal is used to power the controller IC. In another step, the output voltage of the power converter is determined using the feedback signal. In another step, a base signal is received onto a base bond pad of the controller IC. The base signal is indicative of the inductor current flowing through the primary inductor. In another step, the external inductor switch is turned off using the base signal. A regenerative turn-off resulting from current flowing through the auxiliary inductor also contributes to turning off the external inductor switch. In another step, the output current is determined using the base signal.

In the constant voltage mode, the on time of the external inductor switch is adjusted using the base signal such that the output voltage of the power converter remains constant while the output current is below a predetermined current limit.

In the constant current mode, the on time of the external inductor switch is also adjusted using the base signal such that the output current remains constant at the predetermined current limit when a larger output current would be required to achieve the regulated output voltage.

In another embodiment, a power converter includes an inductor switch, a primary inductor, an auxiliary inductor, a base bond pad, a ground bond pad and means for receiving a feedback signal. The base bond pad and ground bond pad are on a controller IC. No current is conveyed to or from the controller IC except through the base bond pad, the ground bond pad and the means. The inductor switch has a collector and a base and exhibits an on time. The primary inductor is coupled to the collector of the inductor switch. The auxiliary inductor is magnetically coupled to the primary inductor. The base bond pad is coupled to the base of the inductor switch.

A base signal present on the base bond pad turns the inductor switch off and is used to adjust the on time of the inductor switch such that the output current of the power converter remains constant. The feedback signal received by the means is derived from a voltage across the auxiliary inductor, is used to power the controller IC, and is used to adjust the on time of the inductor switch such that the output voltage of the power converter remains constant.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 8 is a table of operating parameters of another embodiment of the flyback converter of FIG. 3 that transitions from critical conduction mode to discontinuous conduction mode at different output current load levels depending on input line voltage.

DETAILED DESCRIPTION

Reference will now be made in detail to some embodiments of the invention, examples of which are illustrated in the accompanying drawings.

Figure 1:
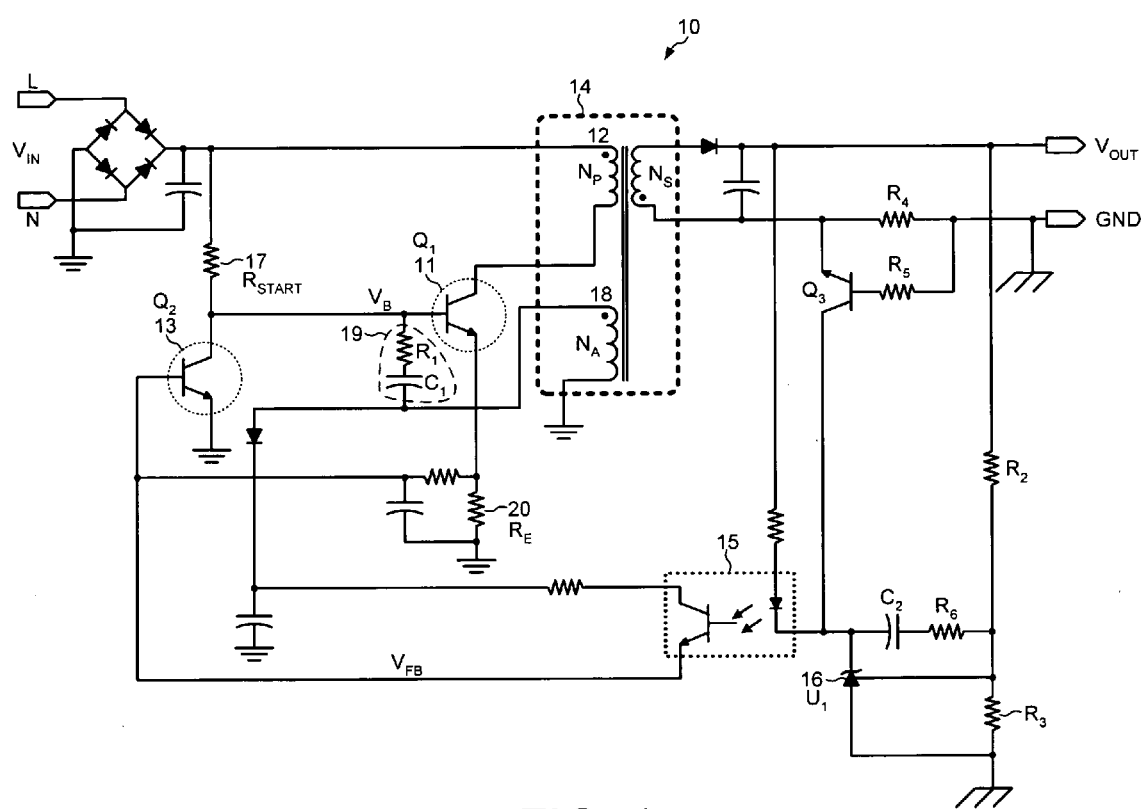
FIG. 1 (prior art) is a simplified schematic diagram of a self-oscillating flyback converter with discrete components that is controlled on the secondary side.
Figure 2:
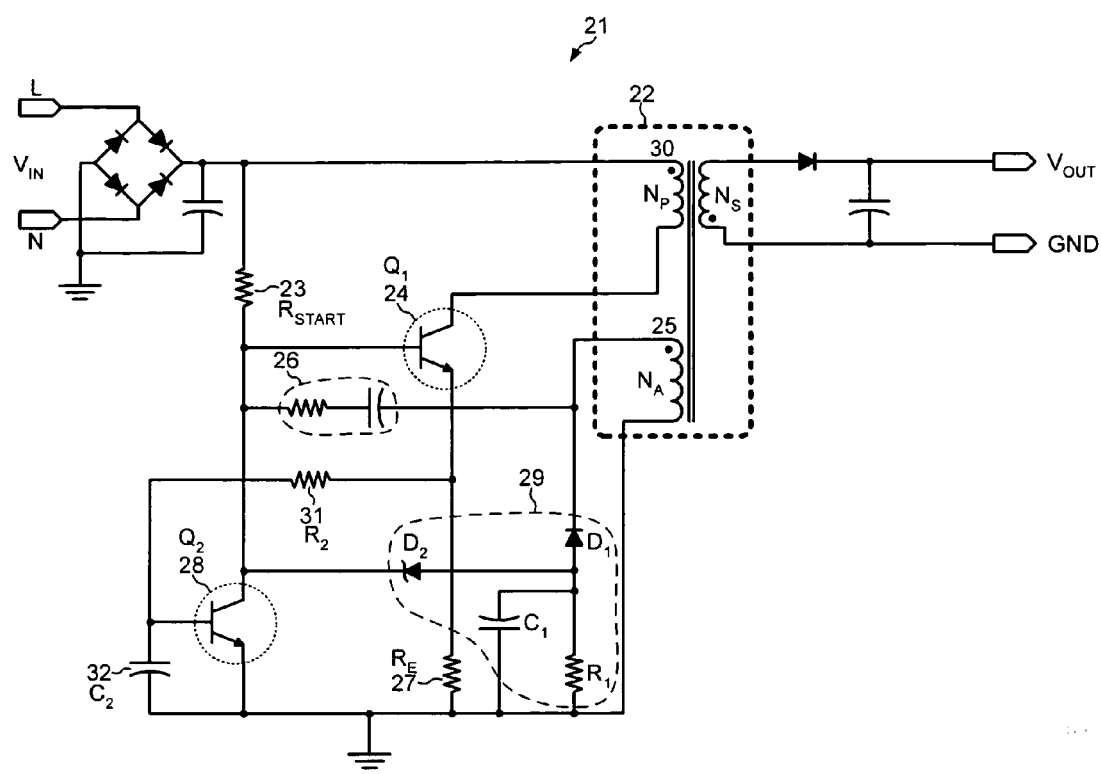
FIG. 2 (prior art) is a simplified schematic diagram of a self-oscillating flyback converter with discrete components that is controlled on the primary side.
Figure 3:
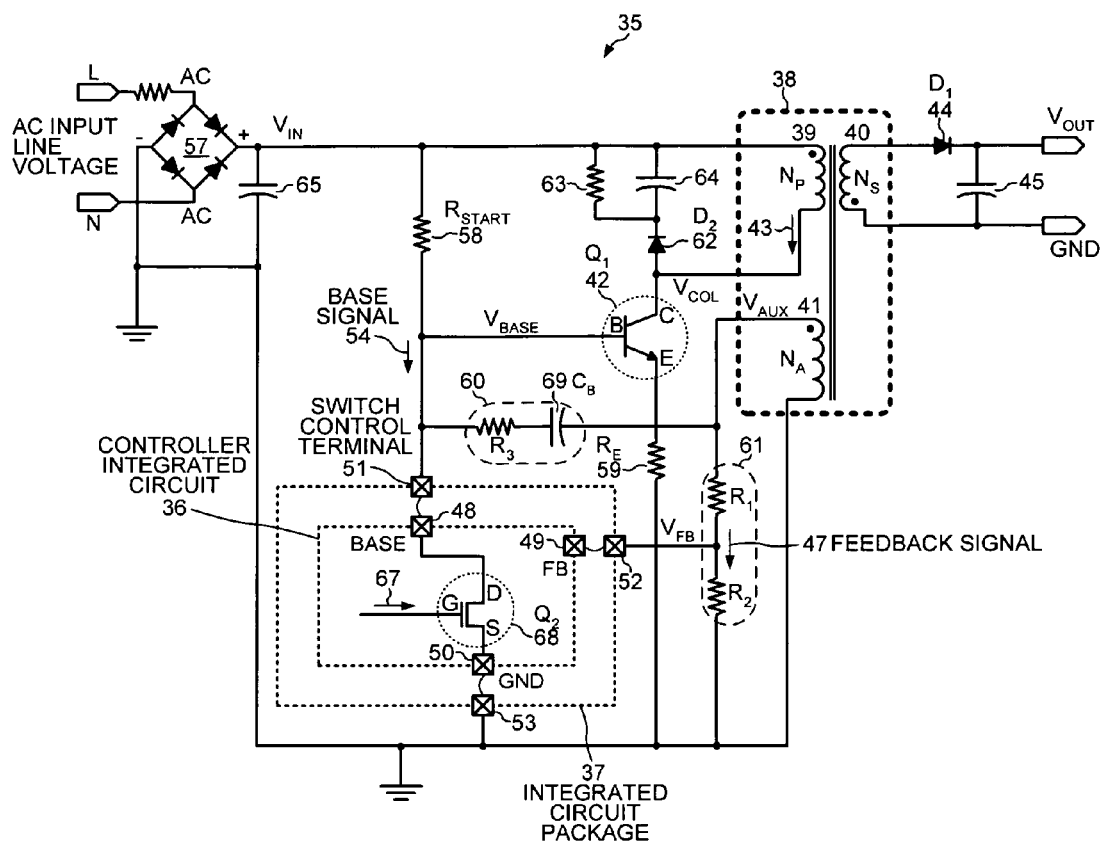
FIG. 3 is a simplified schematic diagram of a self-oscillating, primary-side controlled flyback converter with a controller integrated circuit (IC) housed in an integrated circuit package with only three pins.

FIG. 3 is a diagram of a flyback converter 35 with a controller integrated circuit (IC) 36 packaged in an integrated circuit package 37. Although the term "integrated circuit" is commonly used to denote both an integrated circuit and the integrated circuit package in which the integrated circuit is housed, the term "integrated circuit" as used herein denotes only the integrated circuit die. Flyback converter 35 includes a transformer 38 that converts an input voltage into a different output voltage. Transformer 38 includes a primary inductor (winding) 39, a secondary inductor 40 and an auxiliary inductor 41. Primary inductor 39 has $N_P$ turns; secondary inductor 40 has $N_S$ turns; and auxiliary inductor 41 has $N_A$ turns.

In one embodiment, the input voltage is the voltage from a wall outlet, and the output voltage is used to charge a portable electronic consumer device, such as a cell phone or portable media player. When an inductor switch $Q_1$ 42 in converter 35 is turned on, an inductor current ($I_{LP}$) 43 starts flowing through primary inductor 39. After current ramps up through primary inductor 39 to a peak magnitude and is then stopped, a collapsing magnetic field around primary inductor 39 trans-fers energy to secondary inductor 40. The peak at which current starts flowing through secondary inductor 40 is related by the turns ratio to the peak current $I_{PEAK}$ flowing through primary inductor 39. Current then flows out of secondary inductor 40, forward biases a secondary-side rectifier diode $D_1$ 44, and pours into an output capacitor 45. The energy transferred to secondary inductor 40 is output from flyback converter 35 as the output current with a different output voltage. In some applications, such as charging an electronic consumer device, it is desirable to prevent the output current from exceeding a predetermined current limit.

Figure 4:
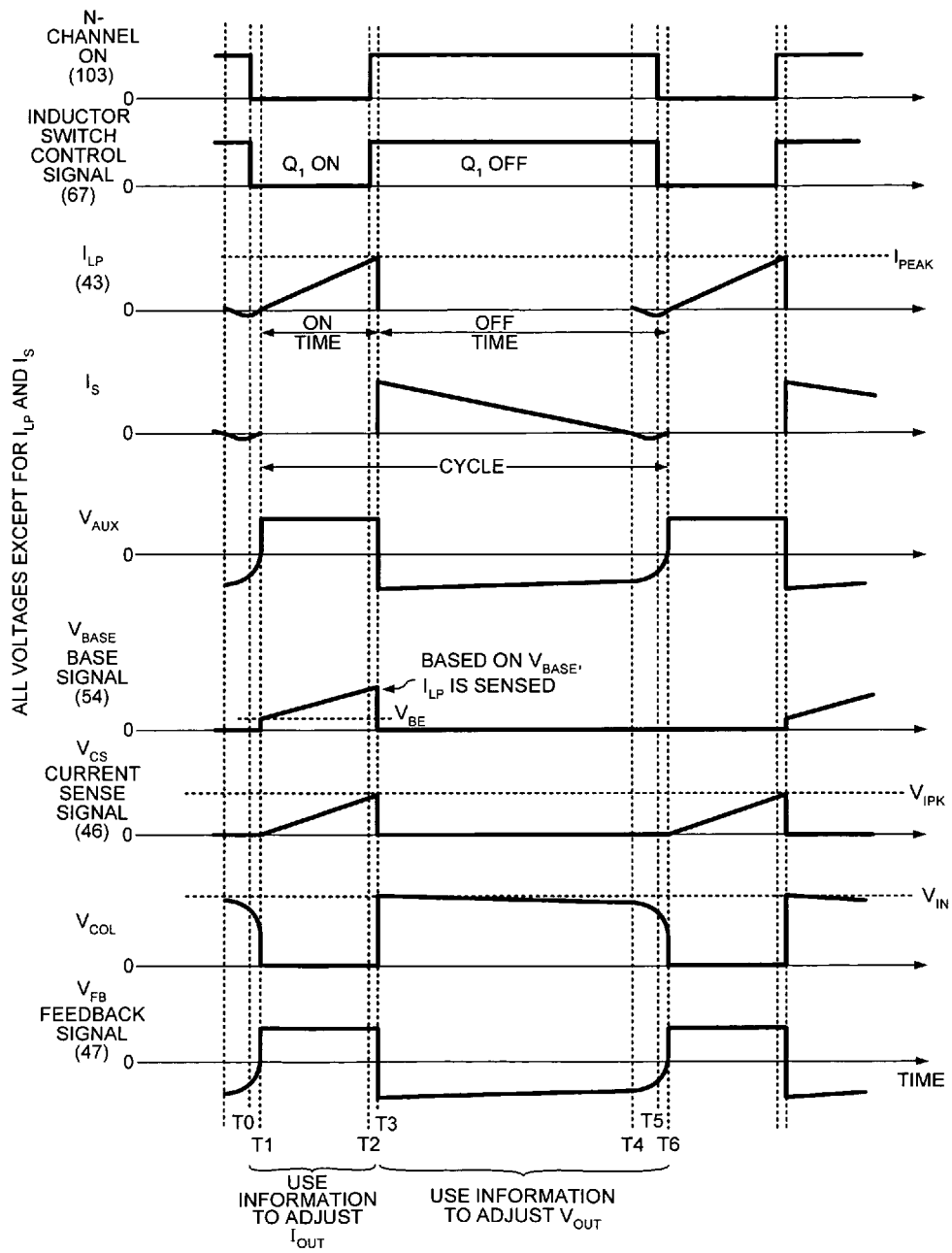
FIG. 4 is a diagram showing idealized waveforms that illustrate the operation of the flyback converter of FIG. 3.

FIG. 4 shows idealized waveforms on various nodes of flyback converter 35. The waveforms illustrate the operation of flyback converter 35, including how inductor switch $Q_1$ 42 is turned on and off. Controller IC 36 controls the output voltage ($V_{OUT}$) and the output current ($I_{OUT}$) of flyback converter 35 by adjusting the peak current that flows through primary inductor 39. The peak current is adjusted by controlling the on time and off time of inductor switch $Q_1$ 42. Flyback converter 35 operates in two modes: a constant current mode and a constant voltage mode. In the constant current mode, controller IC 36 controls the on time of inductor switch $Q_1$ 42 such that a time ($T_3$), at which the primary inductor current $I_{LP}$ 43 stops increasing, corresponds to the time at which a current sense signal ($V_{CS}$) 46 reaches a peak current limit ($V_{IPK}$). In the constant voltage mode, controller IC 36 controls the on-time of inductor switch $Q_1$ 42 such that the time ($T_3$), at which the primary inductor current $I_{LP}$ 43 stops increasing, corresponds to the time at which the current sense signal ($V_{CS}$) 46 reaches an error voltage ($V_{ERROR}$), which is lower than the peak current limit ($V_{IPK}$). The error voltage $V_{ERROR}$ is generated by comparing a reference voltage to a voltage ($V_{FB}$) of a feedback signal 47 derived from auxiliary inductor 41.

In the embodiment of FIG. 3, inductor switch $Q_1$ 42 is an external NPN bipolar transistor. Controller IC 36 has a base bond pad 48, a feedback bond pad 49 and a ground bond pad 50. Because current is conveyed to controller IC 36 via only three bond pads, integrated circuit package 37 has only three terminals: a switch control terminal 51, a feedback terminal 52 and a ground terminal 53. Each terminal of an integrated circuit package adds cost. Thus, it is less expensive to produce controller IC 36 packaged in integrated circuit package 37 than it is to produce controller ICs requiring packages with more than three terminals.

The need for an additional terminal is eliminated by powering controller IC 36 using feedback signal 47 that also contains information indicative of the output voltage $V_{OUT}$ when inductor switch 42 is off. In addition, the need for yet another terminal is eliminated by turning off inductor switch $Q_1$ 42 using a base signal 54 that contains information indicative of the output current ($I_{OUT}$) when inductor switch $Q_1$ 42 is on. Production cost is reduced by eliminating the second external transistor of the prior art ringing choke converters. A comparator inside controller IC 36 is used instead of the second external transistor to achieve self-oscillation.

In another embodiment, inductor switch $Q_1$ 42 is an external MOSFET switch. In yet another embodiment inductor switch $Q_1$ 42 is a field-effect transistor (FET) that is integrated into controller IC 36.

In the embodiment of FIG. 3, base bond pad 48 is connected to switch control terminal 51 by a bond wire. Controller IC 36 uses switch control terminal 51 to control inductor switch $Q_1$ 42 and to receive an indication of the output current $I_{OUT}$. Feedback bond pad 49 is connected to feedback terminal 52 by another bond wire. Controller IC 36 receives power as well as an indication of the output voltage $V_{OUT}$ via feedback terminal 52. Depending on the type of package, switch control terminal 51, feedback terminal 52 and ground terminal 53 can be the three leads of a low-cost 3-pin TO-92 transistor outline package or the three leads of an SOT-23 small outline transistor. The embodiment in which integrated circuit package 37 is a 3-pin TO-92 package allows controller IC 36 to be contained in a low-cost package that is typically used to house a single transistor.

In addition to controller IC 36, IC package 37, transformer 38, NPN bipolar transistor 42, secondary-side rectifier diode $D_1$ 44, and output capacitor 45, flyback converter 35 also includes a diode rectifier bridge 57, a start-up resistor $R_{START}$ 58, an emitter resistor $R_E$ 59, an R/C network 60, a voltage divider resistor network 61, a primary-side rectifier diode $D_2$ 62, a resistor 63 and two capacitors 64-65. Flyback converter 35 has no secondary side control circuit and no optical coupler. Diode rectifier 57 is an AC/DC bridge that converts alternating wall current to a rippled direct current. A first embodiment of converter 35 is configured to generate an output current $I_{OUT}$ in constant current mode of 600 mA and an output voltage $V_{OUT}$ in constant voltage mode of 5 volts. In the first embodiment, diode rectifier 57 can accept an alternating input voltage within a range of 85-265 volts. The magnitudes of the resistance and capacitance in the first embodiment are: $R_1$ 13.8 kOhms, $R_2$ 21.9 kOhms, $R_3$ 1.8 kOhms, $R_E$ 4.3 Ohms, $R_{START}$ 3×2.2 milliohms, and $C_B$ 10 nanoFarads. The inductors have the following turns: $N_P$ 99, $N_S$ 8 and $N_A$ 9.

Inductor switch $Q_1$ 42 is turned on mainly by positive regenerative feedback from auxiliary inductor 41 as opposed to by a switching signal from controller IC 36. However, an inductor switch control signal 67 generated by controller IC 36 does allow charge to accumulate on the base of inductor switch $Q_1$ 42 in order to begin the process of regenerative drive. When flyback converter 35 is first turned on, inductor switch control signal 67 holds open a main power switch $Q_2$ 68 in controller IC 36. This allows input current flowing through start-up resistor $R_{START}$ 58 to accumulate on the base of inductor switch $Q_1$ 42. In one embodiment, start-up resistor $R_{START}$ 58 has a resistance of about 6.6 megaohms.

Inductor current from primary inductor 39 begins to flow through inductor switch $Q_1$ 42 when the voltage ($V_{BASE}$) on the base of inductor switch $Q_1$ 42 rises past the base-emitter turn-on voltage ($V_{BE}$) of NPN bipolar transistor 42. Inductor switch $Q_1$ 42 is completely turned on, however, only when the start-up current through resistor $R_{START}$ 58 is amplified by the current gain of transistor 42 and the auxiliary-to-primary turns ratio ($N_A/N_P$) of the inductors, which causes positive regenerative feedback. Auxiliary inductor 41 is magnetically coupled to primary inductor 39, so the voltage ($V_{AUX}$) on the dot end of auxiliary inductor 41 immediately goes high as current begins to ramp up through primary inductor 39. The magnetic coupling of the primary and auxiliary inductors is illustrated in FIG. 4 by the waveforms for the voltage ($V_{AUX}$) on the dot end of auxiliary inductor 41 and the voltage ($V_{COL}$) on the not-dot end of primary inductor 39 (equivalent to the voltage on the collector of inductor switch $Q_1$ 42). The dot end of auxiliary inductor 41 is coupled through R/C network 60 to the base of inductor switch $Q_1$ 42. A blocking capacitor $C_B$ 69 of R/C network 60 pulls up the base voltage $V_{BASE}$ as the voltage across auxiliary inductor 41 increases, and inductor switch $Q_1$ 42 turns on quickly. The current in the collector and hence the emitter of inductor switch $Q_1$ 42 now ramps up linearly at a rate defined by the inductance ($L_P$) of primary inductor 39 and the input voltage ($V_{IN}$).

Figure 5:
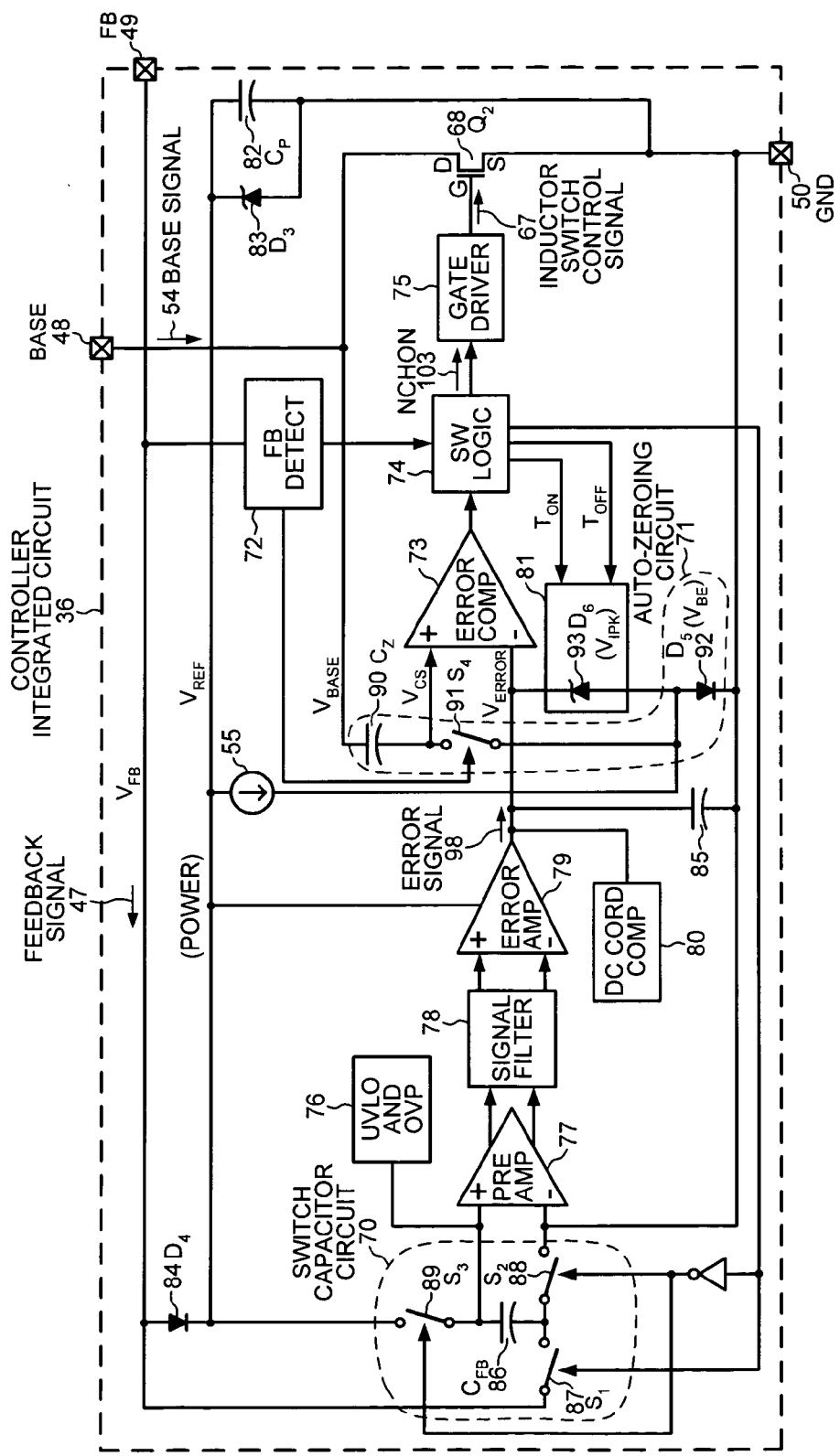
FIG. 5 is a more detailed schematic diagram of the controller IC of FIG. 3 that has only three bond pads.

FIG. 5 is a more detailed schematic diagram of controller IC 36. In addition to internal main power switch 68, controller IC 36 includes a switch capacitor circuit 70, an auto-zeroing circuit 71, a feedback signal detector 72, an error comparator 73, switching logic 74, a gate driver 75, an under-voltage lockout and over-voltage protection circuit (OVP) 76, a preamplifier 77, a signal filter 78, an error amplifier 79, a DC cord compensation circuit 80, a peak current modulator 81, a power capacitor ($C_P$) 82, a power voltage regulator ($D_3$) 83, a diode ($D_4$) 84, and a capacitor 85. Switch capacitor circuit 70 includes a feedback capacitor ($C_{FB}$) 86, a first switch ($S_1$) 87, a second switch ($S_2$) 88, a third switch ($S_3$) 89, and a current source 55. Auto-zeroing circuit 71 includes a zeroing capacitor ($C_Z$) 90, a fourth switch ($S_4$) 91, and a diode ($D_5$) 92. Peak current modulator 81 includes a precision voltage clamp circuit ($D_6$) 93.

FIG. 5 is now used to describe how inductor switch $Q_1$ 42 is turned off. The current $I_{LP}$ 43 flowing through primary inductor 39 is used to determine when to turn off inductor switch $Q_1$ 42. The current flowing through emitter resistor $R_E$ 59 is about equal to the current $I_{LP}$ 43 flowing through primary inductor 39. As the primary inductor current $I_{LP}$ 43 increases and flows out the emitter of inductor switch $Q_1$ 42, the base voltage $V_{BASE}$ of base signal 54 also increases. The base voltage $V_{BASE}$ equals the voltage ($V_{RE}$) across emitter resistor $R_E$ 59 plus the base-emitter offset voltage ($V_{BE}$) of NPN bipolar transistor 42. Thus, $$V_{BASE} = V_{BE} + V_{RE}. \tag{94}$$

In one embodiment, the base-emitter offset voltage $V_{BE}$ is about 0.7 volts. Thus, the primary inductor current $I_{LP}$ 43 is approximately related to the voltage drop $V_{RE}$ across emitter resistor $R_E$ 59 as follows:

$$V_{RE} = I_{LP} \cdot R_E. \tag{95}$$

Equation 95 does not consider the base current error of NPN bipolar transistor 42. (Actually, $V_{RE} = (I_{LP} + I_{BASE}) \cdot R_E$.) Combining equations 94 and 95 describes the primary inductor current $I_{LP}$ 43 as a function of the base voltage $V_{BASE}$ of base signal 54 received onto base bond pad 48 of controller IC 36:

$$I_{LP} = (V_{BASE} - V_{BE})/R_E \tag{96}$$

Thus, the current $I_{LP}$ through primary inductor 39 can be sensed by subtracting the base-emitter offset voltage ($V_{BE}$) from the base voltage $V_{BASE}$. As described later, auto-zeroing circuit 71 subtracts the base-emitter offset voltage ($V_{BE}$) from the base voltage $V_{BASE}$ to generate the current sense voltage $V_{CS}$, such that $$I_{LP} = V_{CS}/R_E. \tag{97}$$

Inductor switch $Q_1$ 42 is turned off when the base voltage $V_{BASE}$ minus the base-emitter voltage $V_{BE}$, as indicated by the voltage $V_{CS}$ of current sense signal 46, reaches the lesser of the error voltage $V_{ERROR}$ during constant voltage mode or the peak current limit $V_{IPK}$ during constant current mode. Error comparator 73 compares the current sense voltage $V_{CS}$ to the error voltage $V_{ERROR}$ of an error signal 98 or to the peak current limit $V_{IPK}$ generated by peak current modulator 81. The error voltage $V_{ERROR}$ indicates the amount of current required to achieve a regulated output voltage of converter 35. In the constant current mode when converter 35 is operating under a heavy load, the output current reaches the peak current limit $V_{IPK}$ before the regulated output voltage can be achieved. Thus, in the constant current mode, error comparator 73 compares the current sense voltage $V_{CS}$ to the peak current limit $V_{IPK}$.

The voltage $V_{IPK}$ corresponding to a predetermined output current limit is set by peak current modulator 81 to equal the current sense voltage $V_{CS}$ that achieves the desired output current. In constant current mode when converter 35 operates in critical conduction mode, the output current can be expressed as a function of total cycle time instead of switching frequency. The total cycle time can be used instead of switching frequency because the switching frequency in critical conduction mode is the inverse of the total time that current is either ramping up or ramping down. Therefore, the output current $I_{OUT}$ can be described by the simplified equation:

$$I_{OUT} = \tfrac{1}{2} \cdot I_{LP} \cdot \{1 - T_{ON}/(T_{ON} + T_{OFF})\} \cdot (N_P/N_S) \cdot \eta \qquad (99)$$

where $I_{LP}$ is the peak current through primary inductor 39, $T_{ON}$ and $T_{OFF}$ are the on and off times of inductor switch $Q_1$ 42, and $\eta$ is the efficiency. The term $T_{ON}/(T_{ON}+T_{OFF})$ is the duty cycle. In one embodiment, the efficiency is about 80%. Note that in constant current mode, the output current is independent of the inductance $L_P$ of primary inductor 39. Combining equations 97 and 99 results in:

$$I_{OUT} = \tfrac{1}{2} \cdot (V_{CS}/R_E) \cdot \{1 - T_{ON}/(T_{ON}+T_{OFF})\} \cdot (N_P/N_S) \cdot \eta \qquad (100)$$

According to equation 100, the voltage $V_{IPK}$ is set equal to the current sense voltage $V_{CS}$ that achieves the desired maximum output current $I_{OUT}$ for a given value of $R_E$. Equation 100 indicates that output current $I_{OUT}$ changes with variation in AC input line voltage. For example, when the AC input line voltage doubles from 110V to 220V, the on time $T_{ON}$ will reduce by half, while the off time $T_{OFF}$ remains constant, and therefore, the output current $I_{OUT}$ will change according to equation 100. But the output current $I_{OUT}$ is independent of input line voltage when $$I_{LP} \cdot \{1 - T_{ON}/(T_{ON}+T_{OFF})\} = 0.576V/(R_E + R_{VBE}) \qquad (101)$$

where the term $R_{VBE}$ compensates for the change in base-emitter voltage as the current through inductor switch $Q_1$ 42 changes. As current through inductor switch $Q_1$ 42 increases, the base-emitter voltage $V_{BE}$ increases. For example, where the current increases from 20 mA to 220 mA and part 13002 is used for NPN bipolar transistor 42, the change in base-emitter voltage is about 62 mV, which can be compensated by a resistance $R_{VBE}$ of about 0.31 Ohms. In this embodiment, $R_{VBE}$ is determined empirically. Thus, the output current is independent of input line voltage and $R_{VBE}$ variation when described as a function of the resistance $R_E$ of emitter resistor 59 as follows:

$$I_{OUT} = \tfrac{1}{2} \cdot 0.576V/(R_E + R_{VBE}) \cdot (N_P/N_S) \cdot \eta \qquad (102)$$

The resistance $R_E$ of emitter resistor 59 is chosen using equation 102 that results in the same desired output current to which the current sense voltage $V_{CS}$ corresponds using equation 100.

Constant Current Mode

In the constant current mode, the current flowing through emitter resistor $R_E$ 59 increases until the current sense voltage $V_{CS}$ equals the peak current limit $V_{IPK}$. Error comparator 73 then trips, and switching logic 74 generates an "N-channel on" (NCHON) signal 103 using a pulse width signal output from error comparator 73. The output from error comparator 73 is used for pulse frequency and width modulation (PFWM) control of the switching of converter 35. Gate driver 75 generates inductor switch control signal 67 using N-channel on signal 103. Gate driver 75 is a relatively high-speed MOSFET gate driver. Inductor switch control signal 67 is asserted and closes main power switch $Q_2$ 68. Current is drained from the base of inductor switch $Q_1$ 42, and inductor switch $Q_1$ 42 begins to turn off. In accordance with normal fly-back action, the voltages across all inductors of transformer 38 reverse when current stops flowing through primary inductor 39. For example, the voltage on the dot end of auxiliary inductor 41 goes negative. The turning off of inductor switch $Q_1$ 42 is augmented by a regenerative turn-off resulting from current flowing through auxiliary inductor 41 and through R/C network 60. The current pulls down the base of inductor switch $Q_1$ 42, turning off inductor switch $Q_1$ 42 quickly.

Inductor switch $Q_1$ 42 remains off until all of the energy that was stored in primary inductor 39 is transferred to secondary inductor 40 and output from converter 35. When current is no longer flowing through any of the inductors, the voltages across the inductors begin to fall to zero at time ($T_4$) in FIG. 4. Feedback signal detector 72 detects when the negative feedback voltage $V_{FB}$ of feedback signal 47 begins to collapse at time $T_4$ and inverts. After feedback signal detector 72 detects time $T_4$, inductor switch control signal 67 closes main power switch $Q_2$ 68 at time $T_5$. Input current through start resistor $R_{START}$ 58 begins to accumulated on the base of inductor switch $Q_1$ 42, and positive regenerative feedback turns on inductor switch $Q_1$ 42 at time $T_6$ and a new cycle begins. The positive regenerative feedback and regenerative turn-off that turn inductor switch $Q_1$ 42 on and off allow converter 35 to self-oscillate.

Auto-zeroing circuit 71 generates the current sense voltage $V_{CS}$ that error comparator 73 compares to the error voltage $V_{ERROR}$. Auto-zeroing circuit 71 subtracts the base-emitter offset voltage $V_{BE}$ from the base voltage $V_{BASE}$ using zeroing capacitor $C_Z$ 90. While inductor switch $Q_1$ 42 is off, the voltage $V_{BASE}$ on the base of inductor switch $Q_1$ 42 as indicated by base signal 54 is grounded. In addition, fourth switch $S_4$ 91 is closed while inductor switch $Q_1$ 42 is off, which couples zeroing capacitor $C_Z$ 90 to diode ($D_5$) 92. Diode ($D_5$) 92 is chosen to have the same voltage drop as the base-emitter offset voltage $V_{BE}$ of inductor switch $Q_1$ 42. Thus, after inductor switch $Q_1$ 42 turns on and fourth switch $S_4$ 91 opens, the voltage on both plates of zeroing capacitor $C_Z$ 90 is one $V_{BE}$. Feedback signal detector 72 detects when feedback signal 47 has inverted and gone high, indicating that inductor switch $Q_1$ 42 is turning on and that the base voltage $V_{BASE}$ is ramping up from one $V_{BE}$. Feedback signal detector 72 opens fourth switch $S_4$ 91 when inductor switch $Q_1$ 42 initially turns on so that current sense signal $V_{CS}$ 46 begins to ramp up from zero volts instead of from one $V_{BE}$. Thus, the base-emitter offset voltage $V_{BE}$ is zeroed out when current sense signal 46 first begins to ramp. Because the base-emitter offset voltage $V_{BE}$ increases with increasing current through inductor switch $Q_1$ 42, the change in the base-emitter offset voltage $V_{BE}$ with increasing current is compensated by adjusting the voltage $V_{IPK}$ corresponding to the peak current limit. Peak current modulator 81 applies the well-known relationship between change in current and change in base-emitter offset voltage $V_{BE}$ when adjusting the voltage $V_{IPK}$. The change in $V_{BE}$ from a change in current is expressed as:

$$\Delta V_{BE} = \frac{KT}{q} \cdot \ln\!\left(\frac{I_1}{I_2}\right). \qquad (104)$$

where K is Boltzmann's constant, T is absolute temperature, q is the electron charge, $I_1$ is the original current and $I_2$ is the changed current.

Constant Voltage Mode

In the constant voltage mode, error comparator 73 compares the current sense voltage $V_{CS}$ to the error voltage $V_{ERROR}$ of error signal 98 because the error voltage $V_{ERROR}$ is below the voltage $V_{IPK}$ corresponding to the peak current limit. When inductor switch $Q_1$ 42 is off, the negative feedback voltage $V_{FB}$ of feedback signal 47 is indicative of the output voltage $V_{OUT}$. The voltage $V_{AUX}$ on the dot end of auxiliary inductor 41 is the opposite of the voltage $V_S$ on the not-dot end of secondary inductor 40 times the turns ratio $N_A/N_S$. The voltage $V_S$ equals the output voltage $V_{OUT}$ plus the voltage $V_{D1}$ drop across secondary-side rectifier diode $D_1$ 44. Thus, $$V_{AUX} = -(V_{OUT} + V_{D1}) \cdot N_A/N_S. \tag{105}$$

Consequently, the feedback voltage $V_{FB}$ present on feedback bond pad 49 can be expressed as:

$$V_{FB} = -(V_{OUT} + V_{D1}) \cdot N_A/N_S \cdot R_2/(R_1 + R_2). \tag{106}$$

In constant voltage mode, controller IC 36 regulates the absolute value of the feedback voltage $V_{FB}$ to equal the reference voltage $V_{REF}$ generated by power voltage regulator $D_3$ 83. During regulation, the output voltage of converter 35 is:

$$V_{OUT} = V_{REF} \cdot \left(1 + \frac{R_1}{R_2}\right)\left(\frac{N_S}{N_A}\right) - V_{D1}. \tag{107}$$

Switch capacitor circuit 70 is used to place opposite but equal charges on feedback capacitor ($C_{FB}$) 86 when converter 35 is operating in regulation. Power voltage regulator 83 is a precision shunt regulator reference that shunts away excess current above a reference voltage of 3.45 V±2%. For example, power voltage regulator $D_3$ 83 is a precision shunt regulator. When inductor switch $Q_1$ 42 is on, the voltage of feedback signal 47 is high, and power capacitor $C_P$ 82 is charged to 3.45 volts when power voltage regulator dumps current from feedback signal 47 that would charge power capacitor 82 above 3.45 volts.

Where a very large amount of current is provided by feedback signal 47, under-voltage lockout and over-voltage protection circuit (OVP) 76 protects controller IC 36. In one embodiment, if after 0.5 microseconds of on time, feedback signal 47 delivers more than 1.15 mA of current to OVP 76, base bond pad 48 is shorted to ground until $V_{REF}$ is drained to one volt. Typically, this takes about one millisecond. The voltage $V_{BASE}$ present on base bond pad 48 is then re-charged by the input voltage until positive regenerative feedback resumes the switching.

All of the elements of controller IC 35 are powered by power capacitor $C_P$ 82. For simplicity, only the power line to error amplifier 79 is shown in FIG. 5.

When inductor switch $Q_1$ 42 is on, both second switch ($S_2$) 88 and third switch ($S_3$) 89 are closed, and first switch ($S_1$) 87 is open. Thus, the reference voltage of 3.45 volts is placed on the top plate of feedback capacitor $C_{FB}$ 86. The inputs from capacitor 86 into preamplifier 77 and into over-voltage protection circuit (OVP) 76 are high impedance, so the 3.45 volts stays on the top plate of feedback capacitor 86. The switches 87-89 are controlled by a control signal generated by switching logic 74 that is similar to N-channel on signal 103, except that the control signal is deasserted at time $T_4$ instead of $T_5$. A sampling system inside feedback signal detector 72 detects when the negative feedback voltage $V_{FB}$ begins to collapse at time $T_4$. At time $T_4$ just before inductor switch $Q_1$ 42 turns off, switch capacitor circuit 70 senses the output voltage $V_{OUT}$ as indicated by equation 106 by opening second switch ($S_2$) 88 and third switch ($S_3$) 89 and closing first switch ($S_1$) 87. This places the negative feedback voltage $V_{FB}$ onto the bottom plate of feedback capacitor $C_{FB}$ 86 and pulls the voltage on the top plate down to zero volts when converter 35 is operating in regulation. Thus, as the negative feedback voltage $V_{FB}$ slowly decays towards zero volts during the off time due to the finite resistance of auxiliary winding 41, the last voltage level of feedback voltage $V_{FB}$ present on the bottom plate of feedback capacitor $C_{FB}$ 86 before switches 87-89 reverse and the voltage is sampled is the negative feedback voltage $V_{FB}$ at time $T_4$. (The decay of the negative feedback voltage $V_{FB}$ toward zero volts during the off time is exaggerated for illustrative purposes in the waveform of FIG. 4.)

The ground and zero-volt signals are amplified by preamplifier 77, and switching transients are filtered out by signal filter 78. The error amplifier 79 compares the ground signal to the zero volts on the top plate and finds them to be equal when converter 35 is in regulation. When converter 35 is in regulation, the error voltage $V_{ERROR}$ does not change, and the on time as governed by the pulse width signal output from error comparator 73 does not change. Error amplifier 79 is a transconductance amplifier because it receives an input voltage differential and outputs a current proportional to the differential. Error amplifier 79 outputs error signal 98 with a current that flows onto capacitor 85 generates the error voltage $V_{ERROR}$.

Where converter 35 is operating above regulation and is outputting a voltage that is too high, the negative magnitudes of both $V_{AUX}$ and feedback voltage $V_{FB}$ are too large. Consequently, the top plate of feedback capacitor $C_{FB}$ 86 is pulled below ground. Error amplifier 79 outputs a smaller error voltage $V_{ERROR}$, which is reached sooner by the ramping current sense signal $V_{CS}$ 46. The pulse width signal output from error comparator 73 generates an inductor switch control signal with a shorter on time. With a shorter on time, the peak current ramping up through primary inductor 39 is reduced and less energy is transferred to the secondary side. Thus, the output voltage is reduced in order to come into regulation.

In constant voltage mode, DC cord compensation circuit 80 provides automatic output cord resistance compensation. An output cord correction of typically about 3% at full power is added to error signal 98. The DC cord compensation improves the accuracy of the output voltage by compensating for the output voltage droop due to the resistance of the output cord.

Discontinuous Conduction Mode

The switching frequency of converter 35 depends on its resonating characteristics, including the inductance $L_P$ of primary inductor 39, the turns ratio of the primary and secondary inductors $N_P/N_S$, and the current and voltage of the reflected load. In constant current mode when converter 35 operates in critical conduction mode, the switching frequency is the inverse of the on time plus the off time of inductor switch $Q_1$ 42. The on time can be expressed as:

$$T_{ON} = \frac{I_{OUT}}{V_{OUT}} \cdot \frac{2 \cdot L_P \cdot V_{OUT}/V_{IN}}{N_P/N_S} \cdot \left(1 + \frac{V_{OUT}}{V_{IN}} \cdot \frac{N_P}{N_S}\right). \tag{108}$$

The off time can be expressed as:

$$T_{OFF} = \frac{I_{OUT}}{V_{OUT}} \cdot \frac{2 \cdot L_P}{(N_P/N_S)^2} \cdot \left(1 + \frac{V_{OUT}}{V_{IN}} \cdot \frac{N_P}{N_S}\right). \tag{109}$$

The switching frequency can be expressed as:

$$f_{OSC} = \frac{V_{OUT} \cdot (N_P/N_S)^2}{2 \cdot L_P \cdot I_{OUT} \cdot \left(1 + \frac{V_{OUT}}{V_{IN}} \cdot \frac{N_P}{N_S}\right)^2}. \quad (110)$$

where $V_{OUT}/V_{IN}$ is the DC voltage conversion ratio.

Figure 6:
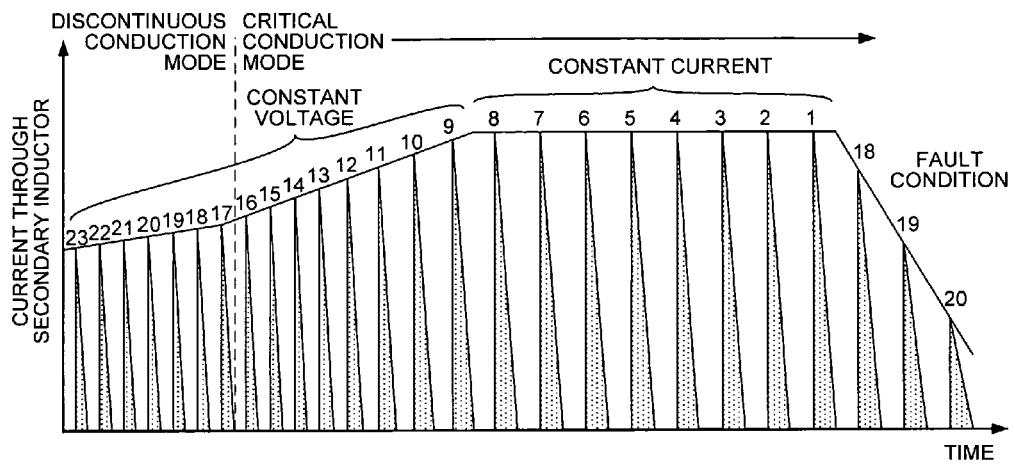
FIG. 6 is a graph of the peak current through the secondary inductor if the flyback converter of FIG. 3 over time in a constant current mode and in a constant voltage mode.

FIG. 6 is a graph of the peak current flowing through secondary inductor 40 over time in the constant current mode and constant voltage mode. Each peak approximates the current output by flyback converter 35 during one switching period. In the normal charging sequence of a battery, for example, the charging begins in the constant current mode at period #1 and enters the constant voltage mode at period #9. The load on converter 35 is heaviest at the beginning when the battery begins charging. The load pulls more current than the predetermined output current limit, and converter 35 limits the output current in the constant current mode. As the battery charges and the load decreases, flyback converter 35 reduces the peak current after period #8 in order to maintain constant voltage. When the light-load threshold is reached at period #17, flyback converter 35 transitions from critical conduction mode to discontinuous conduction mode, and the off time of inductor switch $Q_1$ 42 remains constant.

Figure 7:
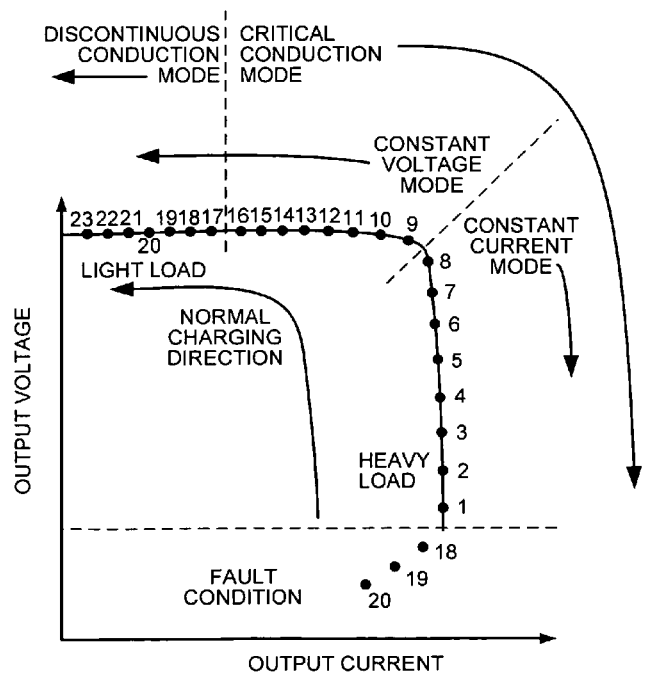
FIG. 7 is a graph of output voltage versus output current for the flyback converter of FIG. 3 showing the regions of operation in the constant current mode, the constant voltage mode, the critical conduction mode and the discontinuous conduction mode.

FIG. 7 is a graph of output voltage versus output current for flyback converter 35. The numbers along the curve correspond to the peak currents in the periods of FIG. 6. A normal charging process begins at point #1 and proceeds to point #23. A fault condition occurs where the output voltage falls below the fault threshold represented by the dashed line. When the output voltage falls below the fault threshold, the feedback voltage ($V_{FB}$) present on feedback bond pad 49 drops below an under-voltage lockout turn-off threshold, and switching stops. In one embodiment, if after 0.5 microseconds of the on time, feedback signal 47 does not deliver at least 0.06 mA of current to UVLO and OVP 76, the under-voltage lockout turn-off threshold is reached. When the turn-off threshold is reached, base bond pad 48 is shorted to ground until $V_{REF}$ is drained to one volt. The voltage ($V_{BASE}$) present on base bond pad 48 is then re-charged by the input voltage until positive regenerative feedback resumes the switching.

As converter 35 enters the constant voltage mode, the error voltage $V_{ERROR}$ goes below the voltage $V_{IPK}$ corresponding to the peak current limit. Error comparator 73 then compares the current sense voltage $V_{CS}$ to the error voltage $V_{ERROR}$ of error signal 98 and causes the on time to decrease. Current ramps up through primary inductor 39 for a shorter time period. The off time during which current flows out of secondary inductor 40 is also shorter. Because converter 35 is self-oscillating, the on time plus the off time equals the total cycle time, and the switching frequency increases in order to prevent the output voltage from exceeding the set maximum. As the battery becomes fully charged, the load decreases and the switching frequency becomes higher and higher to prevent an output voltage that is over the regulation voltage.

At very high switching frequencies, however, the efficiency of a flyback converter decreases as the switching losses become dominant. In order to maintain a high efficiency while charging light loads, switching logic 74 generates N-channel on signal 103 with a minimum off time. Even when the current $I_s$ stops flowing through secondary inductor 40, main power switch $Q_2$ 68 remains open for the minimum off time and does not allow inductor switch $Q_1$ 42 to turn on. When the discharge time of current $I_s$ becomes shorter than the minimum off time, flyback converter 35 transitions from critical conduction mode to discontinuous conduction mode. FIG. 7 illustrates this transition between points #16 and #17. In one embodiment, the minimum off time is ten microseconds, which corresponds to the time required for primary inductor current $I_{LP}$ 43 to ramp to 70% of the peak current level $I_{PEAK}$.

In critical conduction mode, the switching frequency depends on the AC input line voltage. With a higher input line voltage, a shorter on time is required to transfer the same amount of energy. Thus, the frequency used to achieve a regulated voltage is higher for a higher input line voltage. In one embodiment, converter 35 transitions from critical conduction mode to discontinuous conduction mode when the same load level is reached. To switch modes at the same load level, controller IC 36 adjusts the minimum off time such that converter 35 enters discontinuous conduction mode at a higher frequency under a higher input line voltage. For example, the transition from critical conduction mode (CRM) to discontinuous conduction mode (DCM) occurs at about 60 kHz at low input line voltage and at about 100 kHz at high input line voltage.

FIG. 8 is a table of operating parameters of another embodiment of converter 35 that transitions from critical conduction mode to discontinuous conduction mode at different output current load levels depending on the input line voltage. The operating parameters are for an embodiment that outputs 2.75 Watts of power (5V/0.55 A). At a low AC input line voltage of 110 volts, converter 35 transitions to discontinuous conduction mode at an output current load set below 25%. At a high AC input line voltage of 220 volts, converter 35 transitions to discontinuous conduction mode at a set output current load of about 50%. FIG. 8 also lists the peak current level $I_{PEAK}$ at which converter 35 operates most efficiently for a listed output current load level at either a low or a high input line voltage.

Figure 9:
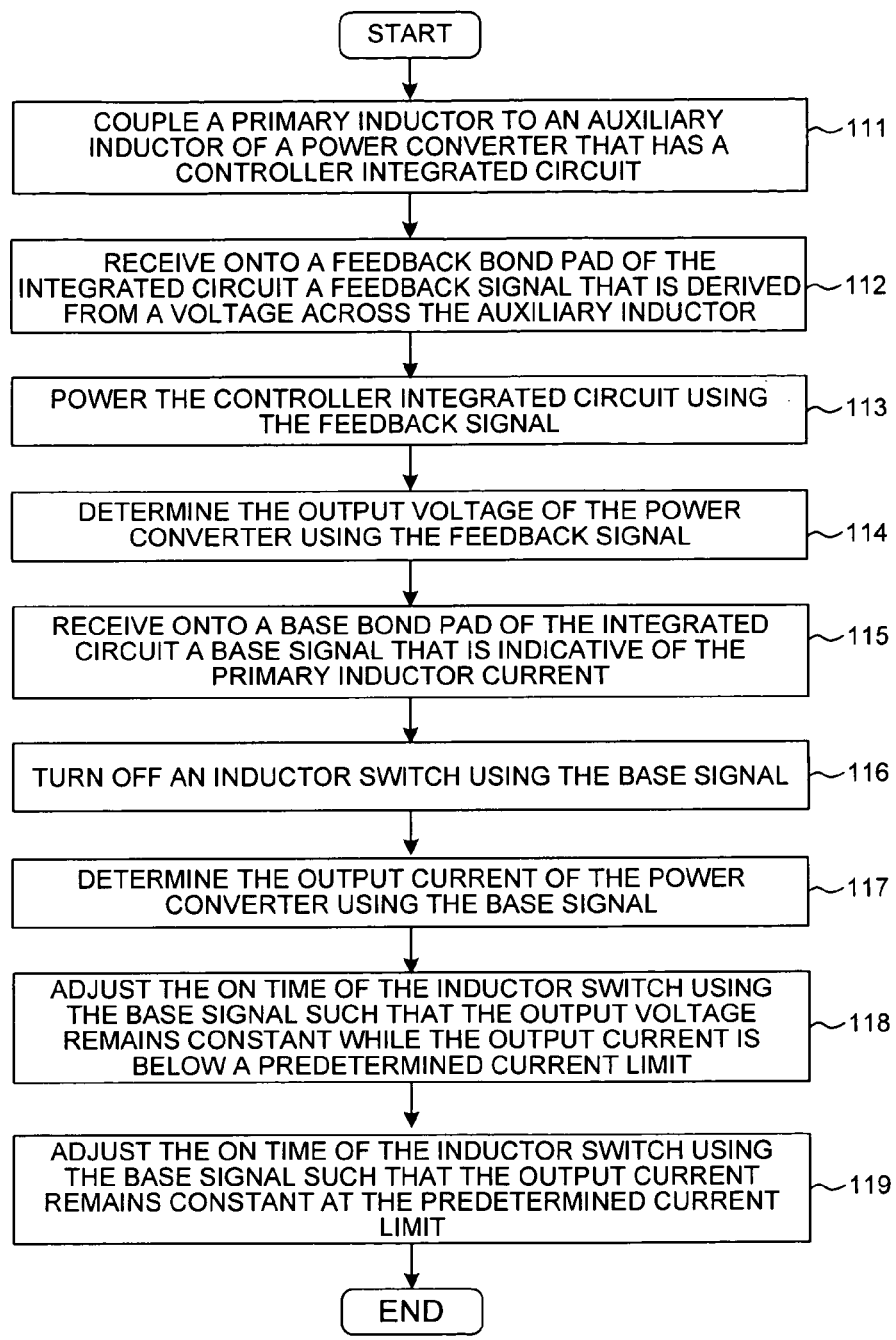
FIG. 9 is a flowchart of a method for controlling the output current and voltage of the flyback converter of FIG. 3 by adjusting the on time of the inductor switch.

FIG. 9 is a flowchart illustrating steps 111-119 of a method of operation of the flyback converter 35 of FIG. 3. The method controls both the output current ($I_{OUT}$) and the output voltage ($V_{OUT}$) of flyback converter 35 by adjusting the on time of inductor switch $Q_1$ 42 using inductor switch control signal 67.

In a first step 111, secondary inductor 40 and auxiliary inductor 41 are magnetically coupled to first inductor 39. When inductor current 43 starts ramping up through primary inductor 39 at time $T_1$ in FIG. 4, the feedback voltage $V_{FB}$ of feedback signal 47 generated by auxiliary inductor 41 and voltage divider resistor network 61 increases rapidly. Feedback signal 47 is derived from the voltage across auxiliary inductor 41.

In step 112, feedback signal 47 is received onto feedback bond pad 49 of controller IC 36.

In step 113, controller IC 36 is powered using feedback signal 47. Feedback signal 47 supplies current through diode $D_4$ 84 and onto power capacitor $C_P$ 82. Current from power capacitor 82 powers the components of controller IC 36, such as error amplifier 79, feedback signal detector 72 and error comparator 73.

In step 114, the output voltage $V_{OUT}$ of converter 35 is determined using feedback signal 47. When inductor switch $Q_1$ 42 is off, the magnitude of the negative voltage of feedback signal 47 provides an indication of the output voltage.

In step 115, base signal 54 is received onto base bond pad 48 of controller IC 36. When inductor switch $Q_1$ 42 is on, base signal 54 provides an indication of the current $I_{LP}$ 43 flowing through primary inductor 39.

In step 116, base signal 54 is used to turn off inductor switch $Q_1$ 42. When the ramping voltage $V_{CS}$ of current sense signal 46 reaches the lower of the error voltage $V_{ERROR}$ of error signal 98 or the peak current limit $V_{IPK}$ generated by peak current modulator 81, inductor switch control signal 67 opens main power switch $Q_2$ 68 and causes current to drain from the base of inductor switch $Q_1$ 42. The on time ends when inductor switch $Q_1$ 42 opens, and the current $I_{LP}$ 43 stops ramping up through primary inductor 39.

In step 117, the output current $I_{OUT}$ is determined using base signal 54. Base signal 54 provides an indication of the current $I_{LP}$ 43 flowing through primary inductor 39 and thus also an indication of the output current $I_{OUT}$ of converter 35. Current sense signal $V_{CS}$ 46 is generated from base signal 54 by subtracting out the base-emitter offset voltage $V_{BE}$ of NPN bipolar transistor 42. The output current $I_{OUT}$ is related to the voltage $V_{CS}$ of current sense signal 46 according to equation 100.

In step 118, the on time of inductor switch $Q_1$ 42 is adjusted using base signal 54 such that the output voltage $V_{OUT}$ remains constant while the output current is below a predetermined current limit. Controller IC 36 controls the output voltage when the error voltage $V_{ERROR}$ is below the peak current limit $V_{IPK}$ during the constant voltage mode.

In step 119, the on time of inductor switch $Q_1$ 42 is adjusted using base signal 54 such that the output current $I_{OUT}$ remains constant at a predetermined current limit. Controller IC 36 controls the output current when the error voltage $V_{ERROR}$ is above the peak current limit $V_{IPK}$ during the constant current mode. The on time ends when the ramping voltage $V_{CS}$ of current sense signal 46 reaches the peak current limit $V_{IPK}$ generated by peak current modulator 81.

Compensation for Variations in Input Line Voltage

Controller IC 36 provides accurate constant current operation despite wide variations in AC input line voltage. Auto-zeroing circuit 71 is used to zero out the base-emitter offset voltage $V_{BE}$ when current sense signal 46 first begins to ramp. As explained above, the auto-zeroing is augmented by peak current modulator 81 because the base-emitter offset voltage $V_{BE}$ increases with increasing current through inductor switch $Q_1$ 42. The change in the base-emitter offset voltage $V_{BE}$ with increasing current is compensated by the term $R_{VBE}$ in equation 101. The output current $I_{OUT}$ changes with change in input line voltage because the on time $T_{ON}$ of inductor switch $Q_1$ 42 is related to input line voltage. However, the off time $T_{OFF}$ of inductor switch $Q_1$ 42 remains constant, and the output current $I_{OUT}$ is proportional to the quantity $\{1-T_{ON}/(T_{ON}+T_{OFF})\}$. Peak current modulator 81 factors in this effect when setting the peak voltage $V_{IPK}$ as the AC input line voltage changes.

As explained above with regard to equation 101, in constant current mode the output current $I_{OUT}$ is independent of input line voltage when the product $I_{LP} \cdot \{1-T_{ON}/(T_{ON}+T_{OFF})\}$ is constant. Thus, peak current modulator 81 changes the peak voltage $V_{IPK}$ inversely to the value $\{1-T_{ON}/(T_{ON}+T_{OFF})\}$ such that the product of the two remains equal to 0.576 volts, as indicated when both sides of equation 101 are divided by $(R_E+R_{VBE})$. For example, peak current modulator 81 adjusts the peak voltage $V_{IPK}$ downward for an increasing value of (1-duty cycle) as the duty cycle decreases with increasing input line voltage. Thus, the peak voltage $V_{IPK}$ is lower at higher input line voltages because the same peak current $I_{PEAK}$ is reached with a shorter duty cycle at a higher input line voltage than is reached with a longer duty cycle at a lower input line voltage.

Figure 10:
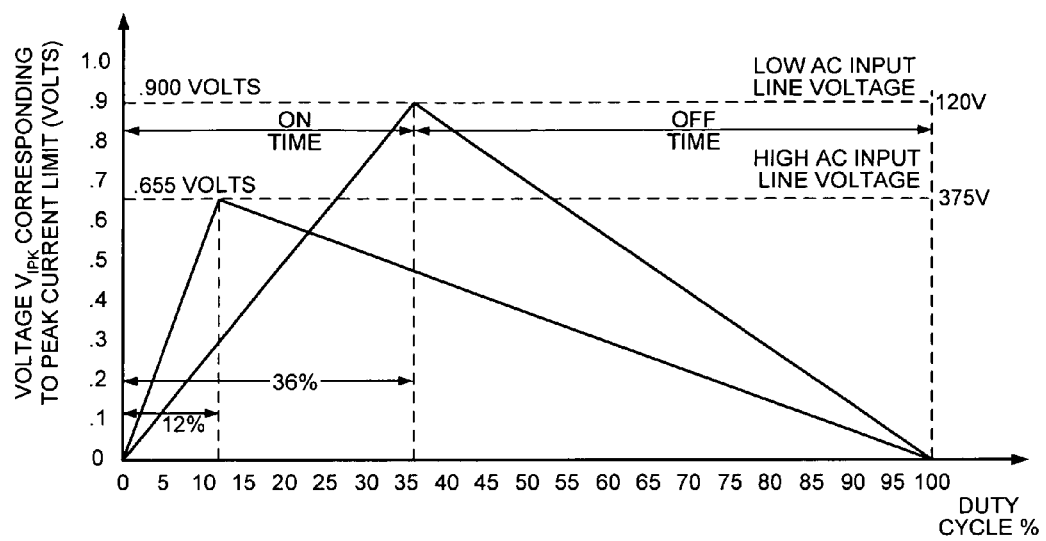
FIG. 10 is a graph of the relationship between the peak voltage limit and the duty cycle of the flyback converter of FIG. 3 under high and low AC input line voltages.

FIG. 10 is a graph of the relationship between the peak voltage $V_{IPK}$ and the percent duty cycle under sample high and low AC input line voltages. The peak voltages and duty cycles of FIG. 9 were obtained using a primary inductor having an inductance of 6.7 milli Henries. Peak current modulator 81 receives an indication of the on time $T_{ON}$ and off time $T_{OFF}$ from switching logic 74 and adjusts the peak voltage $V_{IPK}$ such that the product of the peak voltage $V_{IPK}$ times (1-duty cycle) equals about 0.576 volts. For example, where the on time for a predetermined output current is achieved with a 36% duty cycle at a low AC input line voltage of 120 volts, peak current modulator 81 sets the peak voltage $V_{IPK}$ at 0.900 volts such that the product of the peak voltage times (1-duty cycle) is about 0.576 volts. Where the on time for the predetermined output current is achieved with only a 12% duty cycle at a high AC input line voltage of 375 volts, peak current modulator 81 sets the peak voltage $V_{IPK}$ at 0.655 volts such that the product of the peak voltage and (1-duty cycle) remains at about 0.576 volts.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. An integrated circuit package, comprising:
a switch control terminal that is coupled to an inductor switch, wherein the inductor switch is turned off by an inductor switch control signal that has an on time, wherein a controller integrated circuit contained in the integrated circuit package adjusts the on time in a constant current mode such that an output current of a flyback converter remains constant and adjusts the on time in a constant voltage mode such that an output voltage of the flyback converter remains constant;
a feedback terminal through which the controller integrated circuit receives power; and
a ground terminal through which the controller integrated circuit is grounded.

2. The integrated circuit package of claim 1, wherein the flyback converter is self-oscillating.

3. The integrated circuit package of claim 1, wherein the integrated circuit package includes no terminals other than the switch control terminal, the feedback terminal and the ground terminal.

4. The integrated circuit package of claim 1, wherein the flyback converter operates in critical conduction mode during the constant current mode.

5. The integrated circuit package of claim 1, wherein a base signal is received on the switch control terminal, and wherein the base signal is indicative of a current flowing through an inductor of the flyback converter.

6. The integrated circuit package of claim 5, wherein the controller integrated circuit includes an auto-zeroing circuit, wherein the inductor switch exhibits a base-emitter offset voltage, wherein the base signal has a voltage, and wherein the auto-zeroing circuit determines the current flowing through the inductor by auto-zeroing the voltage of the base signal such that the base-emitter offset voltage is subtracted out.

7. The integrated circuit package of claim 5, wherein the inductor switch has a base and a collector, wherein the switch control terminal is coupled to the base, and wherein the collector is coupled to the inductor.

8. The integrated circuit package of claim 1, wherein a feedback signal is received on the feedback terminal, and wherein the feedback signal is indicative of a voltage across an inductor of the flyback converter.

9. An integrated circuit package, comprising:
a switch control terminal that is coupled to an external inductor switch and to an internal power switch, wherein the internal power switch is turned off by an inductor switch control signal that has an on time, and wherein a controller integrated circuit contained in the integrated circuit package adjusts the on time such that an output voltage of a flyback converter remains constant;
a feedback terminal that receives a feedback signal, wherein the feedback signal is derived from a voltage across a first inductor of the flyback converter, wherein the feedback signal provides power to the controller integrated circuit, and wherein the feedback signal is used by the controller integrated circuit to generate the inductor switch control signal; and
a ground terminal through which the controller integrated circuit is grounded, wherein the integrated circuit package includes no terminals other than the switch control terminal, the feedback terminal and the ground terminal.

10. The integrated circuit package of claim 9, wherein the controller integrated circuit adjusts the on time in a constant voltage mode such that the output voltage of the flyback converter remains constant, wherein the controller integrated circuit adjusts the on time in a constant current mode such that an output current of the flyback converter remains constant, and wherein the flyback converter operates in critical conduction mode during the constant current mode.

11. The integrated circuit package of claim 9, wherein the feedback signal provides power to the controller integrated circuit when the external inductor switch is on, and wherein the feedback signal is used by the controller integrated circuit to determine the output voltage of the flyback converter when the external inductor switch is off.

12. The integrated circuit package of claim 9, wherein the voltage across the first inductor is a feedback voltage, wherein the controller integrated circuit includes a switch capacitor circuit, wherein the output voltage of the flyback converter is determined by the switch capacitor circuit providing the feedback voltage with a negative magnitude to a plate of a capacitor and a reference voltage of a similar positive magnitude to another plate of the capacitor.

13. The integrated circuit package of claim 9, wherein a base signal is received on the switch control terminal, and wherein the base signal is indicative of a rate at which current flows through a second inductor of the flyback converter.

14. The integrated circuit package of claim 13, wherein the first inductor is an auxiliary inductor of the flyback converter, and wherein the second inductor is a primary inductor of the flyback converter.

15. The integrated circuit package of claim 9, wherein in a constant voltage mode the output current of the flyback converter is less than a predetermined current limit, and wherein in the constant voltage mode the controller integrated circuit adjusts the on time such that the output voltage of the flyback converter remains constant, and wherein the flyback converter operates in discontinuous conduction mode in the constant voltage mode when the output current of the flyback converter falls below a set percentage of the predetermined current limit.

16. A power converter, comprising:
a primary inductor;
an inductor switch coupled to the primary inductor, wherein the inductor switch has a base;
an auxiliary inductor that is magnetically coupled to the primary inductor; and
a controller integrated circuit having an internal power switch, a feedback bond pad, a base bond pad and a ground bond pad, wherein the base bond pad is coupled to the internal power switch and to the base of the inductor switch, wherein the internal power switch is turned off by an inductor switch control signal that has an on time, wherein the controller integrated circuit receives power through the feedback bond pad, wherein the feedback bond pad receives a feedback signal that is used by the controller integrated circuit to generate the inductor switch control signal, and wherein the controller integrated circuit adjusts the on time of the inductor switch control signal in a constant current mode such that an output current of the power converter remains constant.

17. The power converter of claim 16, wherein the inductor switch control signal is deasserted when the inductor switch is on.

18. The power converter of claim 16, wherein the power converter operates in critical conduction mode in the constant current mode.

19. The power converter of claim 16, wherein the controller integrated circuit has no bond pads other than the feedback bond pad, the base bond pad and the ground bond pad.

20. The power converter of claim 16, wherein the feedback signal is derived from a voltage across the auxiliary inductor, and wherein the controller integrated circuit adjusts the on time of the inductor switch control signal in a constant voltage mode using the feedback signal when the inductor switch is off.

21. The power converter of claim 16, wherein a base signal is received onto the base bond pad, wherein the base signal is indicative of a current flowing through the primary inductor, and wherein the controller integrated circuit adjusts the on time of the inductor switch control signal in a constant current mode using the base signal when the inductor switch is on.

22. The power converter of claim 16, wherein an inductor current flowing through the primary inductor has a magnitude, wherein the inductor switch exhibits a base-emitter offset voltage, wherein a base signal having a voltage is received onto the base bond pad, wherein the controller integrated circuit generates an auto-zeroed voltage of the base signal by subtracting the base-emitter offset voltage from the voltage of the base signal, and wherein the controller integrated circuit determines the magnitude of the inductor current using the auto-zeroed voltage of the base signal.

23. A method comprising:
magnetically coupling a primary inductor to an auxiliary inductor of a power converter, wherein an inductor current flows through the primary inductor during an on time of an inductor switch, wherein the power converter has a controller integrated circuit with a feedback bond pad and a base bond pad, and wherein the power converter generates an output current and an output voltage;
receiving onto the feedback bond pad a feedback signal that is derived from a voltage across the auxiliary inductor;
powering the controller integrated circuit using the feedback signal;
determining the output voltage using the feedback signal;
receiving onto the base bond pad a base signal that is indicative of the inductor current;
turning off the inductor switch using the base signal; and
determining the output current using the base signal.

24. The method of claim 23, further comprising:
adjusting the on time of the inductor switch using the base signal such that the output voltage remains constant while the output current is below a predetermined current limit; and adjusting the on time of the inductor switch using the base signal such that the output current remains constant at the predetermined current limit.

25. The method of claim 23, wherein the output voltage is determined using the feedback signal while the inductor switch is off.

26. The method of claim 23, wherein the output current is determined using the base signal while the inductor switch is on.

27. The method of claim 23, wherein the controller integrated circuit is contained in an integrated circuit package, wherein the integrated circuit package has a feedback terminal, a switch control terminal and a ground terminal, wherein the controller integrated circuit has a ground bond pad, wherein the feedback terminal is coupled to the feedback bond pad, the switch control terminal is coupled to the base bond pad and the ground terminal is coupled to the ground bond pad, and wherein the integrated circuit package includes no terminals other than the feedback terminal, the switch control terminal and the ground terminal.

28. A power converter, comprising:
a. an inductor switch having a collector and a base, wherein the inductor switch has an on time;
a primary inductor coupled to the collector of the inductor switch;
an auxiliary inductor that is magnetically coupled to the primary inductor; and
a base bond pad of a controller integrated circuit, wherein the base bond pad is coupled to the base of the inductor switch, wherein a base signal present on the base bond pad turns off the inductor switch; and
means for receiving a feedback signal that is derived from a voltage across the auxiliary inductor, wherein the feedback signal is used both to power the controller integrated circuit and to adjust the on time of the inductor switch such that an output voltage of the power converter remains constant.

29. The power converter of claim 28, further comprising:
a ground bond pad of the controller integrated circuit, wherein no current is conveyed to or from the controller integrated circuit except through the base bond pad, the ground bond pad and the means.

30. The power converter of claim 28, wherein the controller integrated circuit is packaged in an integrated circuit package that includes a switch control terminal, a feedback terminal and a ground terminal, wherein the base bond pad is coupled to the switch control terminal, wherein the means is coupled to the feedback terminal, and wherein the integrated circuit package includes no more than three terminals.

31. The power converter of claim 28, wherein the inductor switch, the primary inductor, the auxiliary inductor, the base bond pad and the means are on a primary side of the power converter, wherein a secondary inductor is on a secondary side of the power converter, and wherein the controller integrated circuit receives no signal from the secondary side.

* * * * *